Sept. 13, 1932.  S. L. GOLDSBOROUGH  1,877,454
HIGH SPEED DIRECTIONAL RELAY ELEMENT
Filed May 1, 1930
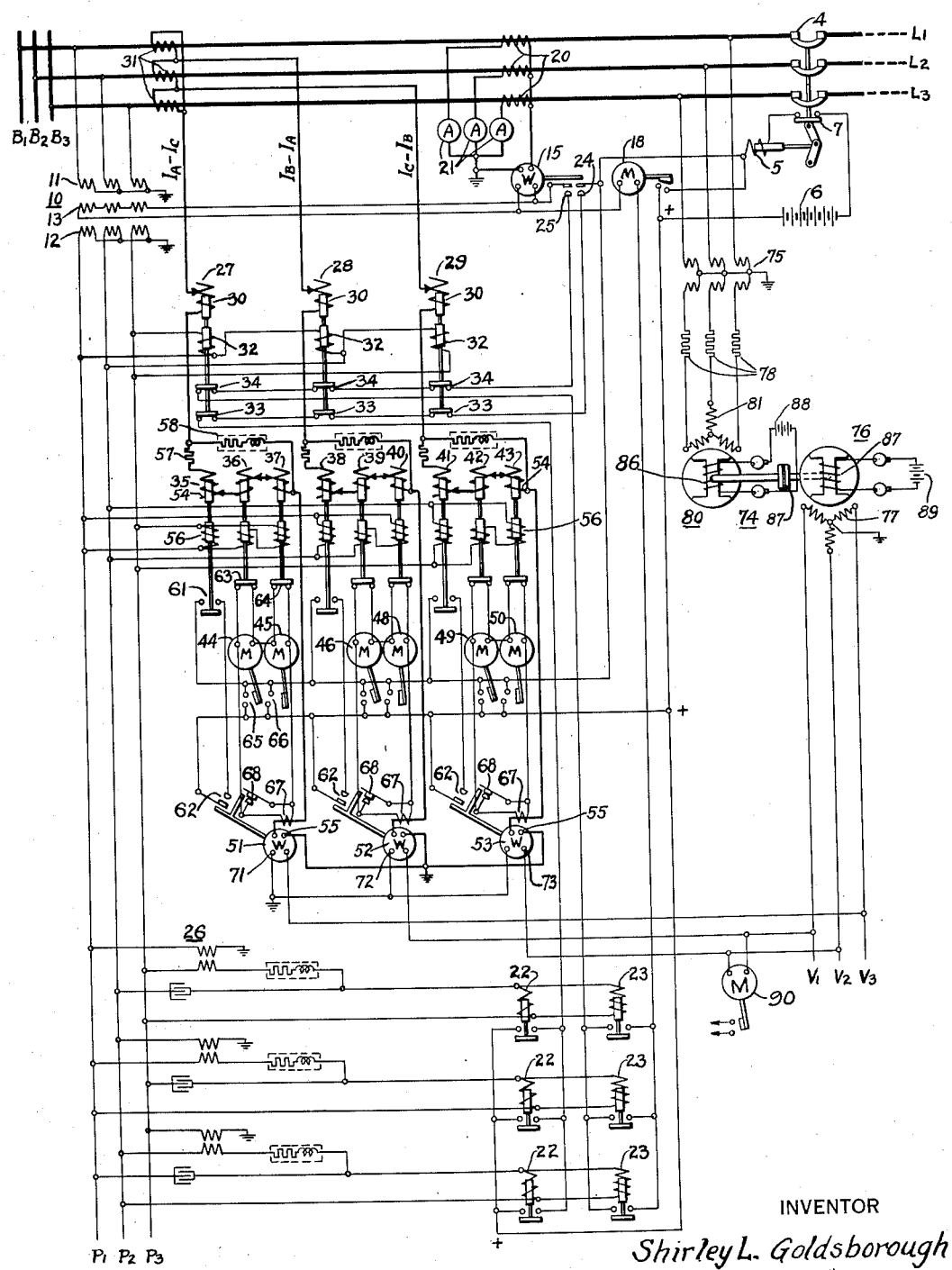
INVENTOR
Shirley L. Goldsborough
BY Wesley G. Carr
ATTORNEY Patented Sept. 13, 1932

1,877,454

UNITED STATES PATENT OFFICE

SHIRLEY L. GOLDSBOROUGH, OF EAST ORANGE, NEW JERSEY, ASSIGNOR TO WESTINGHOUSE ELECTRIC & MANUFACTURING COMPANY, A CORPORATION OF PENNSYLVANIA

HIGH-SPEED DIRECTIONAL RELAY ELEMENT

Application filed May 1, 1930. Serial No. 448,938.

My invention relates to transmission lines in which the faults are cleared very quickly in order to prevent the two ends of the lines from falling out of synchronism, and my invention has more particular relation to the directional elements of high-speed relays which are utilized on such transmission systems.

It is practically impossible to build a directional element which has wattmeter characteristics, to operate in one cycle or less, on a 60-cycle line, over the wide range of voltages and power factors which are met in practice. If a directional wattmeter element is made to operate in one cycle at one volt, it will have a tendency to follow the double-frequency power wave at high voltage and poor power factor.

The primary object of my invention is to provide means for maintaining substantially full voltage on a directional element during trouble.

With the foregoing and other objects in view, my invention consists in the systems and apparatus hereinafter described and claimed and illustrated in the accompanying drawing, the single figure of which is a diagrammatic view of circuits and apparatus illustrative of a complete relaying system embodying my invention and adapted to afford complete protection to a transmission line.

This application is a companion application to an application of R. D. Evans, et al., Serial No. 403,390 filed October 30, 1929, covering the maintenance of power system stability by means of high-speed breakers and relays; also my copending application, Serial No. 448,937 filed May 1, 1930, relating to the construction of the standard high-speed impedance-responsive relay, type HZ of the Westinghouse Electric & Manufacturing Company, said relays being responsive to faults involving a short circuit of two or three phase-conductors of a transmission line; and also an application of L. S. C. Tippett, Serial No. 448,988 filed May 1, 1930, covering a negative and zero phase-sequence relaying means responsive to single-phase line-to-ground faults, and means for properly energizing the current coils of delta-connected distance-responsive relay-elements by means of delta currents instead of the usual line currents or star currents.

The drawing shows my invention applied to a transmission system of the type covered by the Evans application and comprising a three-phase line $L_1$, $L_2$ and $L_3$ energized from a bus $B_1$, $B_2$ and $B_3$ and provided with an oil circuit-breaker 4 having a tripping coil 5 which is adapted to be energized from a battery 6 through back contacts 7 by means of a relaying system now to be described.

The complete relaying equipment necessary for the full protection of the transmission line divides itself into two portions. One portion protects the line against single-phase line-to-ground faults, as covered by the Tippett application, and the other portion of the relaying equipment protects the line against all other faults, as shown in my copending application, the relaying system of which is here modified by the more accurate energization of the current coils shown in the Tippett application, and by the introduction of my novel means for maintaining the voltage on the directional elements during trouble.

The relay means for responding to single-phase line-to-ground faults comprises a step-down potential transformer 10 having star-connected primary and secondary windings 11 and 12 and tertiary windings 13 connected in open delta, which is closed by the voltage winding of an instantaneous directional wattmeter relay-element 15 and sometimes also by a synchronous timing-motor element 18 which may be connected in parallel to the voltage coil of the wattmeter element 15. The directional wattmeter element 15 is thus energized, on its voltage side, by the residual, or zero-phase-sequence, component of the line voltage, said component occurring whenever there is an unbalanced line-to-ground fault on the transmission line. The current coils of the directional element 15 are similarly energized from the residual line current, which is derived by means of a set of star-connected current transformers 20 which energize three current-responsive devices, such as ammeters 21, connected in star, the star points of the ammeters 21 and of the current transformers 20 being joined by means of the current coils of the directional relay 15.

The distance elements which respond to the distance of single-phase ground faults comprise two overvoltage relay-elements in each phase, as shown at the bottom of the figure, and designated by the numerals 22 and 23, respectively. Two relays are provided in each phase so that the first relay 22 will respond to nearby faults and will instantly energize the tripping coil 5 of the circuit-breaker, provided that a pair of contacts 24 on the directional element 15 are closed. The second overvoltage relay element 23 will respond to more remote grounds and will energize the timing element 18, provided that a second pair of contacts 25 on the directional element 15 are closed.

The overvoltage relay-elements are energized from a special phase-sequence network 26 which is connected to the terminals of the potential-transformer secondary windings 12, as set forth in the Tippett application, so as to derive a voltage having parts of the negative-phase-sequence line voltage and the zero-phase-sequence line voltage so combined that the resultant voltage which is applied to the relays decreases steadily from a predetermined fixed maximum value as the relaying point is removed further and further away from a single-phase ground.

Means are provided for preventing the relaying operations just described, whenever there is a fault on the transmission line, embodying a short circuit between either two or three of the phase-conductors of the line. To this end, as set forth in the Tippett application, three special impedance relays 27, 28 and 29 are provided, having current coils 30 which are connected in star across the terminals of a set of delta-connected current transformers 31 responsive to the transmission line currents. The impedance relays 27, 28 and 29 have voltage coils 32 which are energized from the corresponding delta phases of the potential transformer secondary windings 12. These impedance relays are each provided with two normally closed contacts 33 and 34. The three normally closed contacts 33 are connected in series with each other and in series with the shunt-connected contacts of the first overvoltage relay elements 22 and in series also with the first pair of contacts 24 of the directional element 15. The contacts 34 of the impedance relays 27, 28 and 29 are similarly connected in series with each other and in series with the shunt-connected contacts at the second overvoltage relay elements 23, and also in series with the second pair of contacts 25 of the directional element 15. The effect of these connections is to render the overvoltage relay elements 22 and 23 ineffective whenever a line-to-line fault occurs within a predetermined distance which is preferably greater than the distance of the faults responded to by the overvoltage relay-elements.

The relaying equipment which is responsive to line-to-line faults, including short circuits between two phases of the transmission line, double line-to-ground faults and three-phase faults, includes three sets of three impedance elements 35, 36, 37; 38, 39, 40; and 41, 42, 43; three pairs of timing switches 44, 45; 46, 48; and 49, 50; and three instantaneous directional wattmeter elements 51, 52 and 53. The current coils 54 of the nine impedance elements are connected in star, three to a phase, in series with the current coils 30 of the previously mentioned impedance elements 27, 28 and 29, and also in series with the current winding terminals 55 of the three directional elements 51, 52 and 53. These current coils are thus energized from the delta currents $I_A - I_C$; $I_B - I_A$; and $I_C - I_B$; where $I_A$, $I_B$ and $I_C$ are the three line currents.

The current coils 54 of each group of impedance relay elements 35, 36 and 37, etc., are connected in series with each other and in series with an external resistor 57, the whole being shunted by a transient shunt 58 having the same phase as the phase of the transmission line impedance, as set forth in an application of L. N. Crichton, Serial No. 422,965 filed January 23, 1930, covering this transient shunt connection for the purpose of filtering out of the current coils the direct-current transient component of asymmetrical short-circuit currents, or currents which are initiated at such portions of the voltage cycle that the current can not instantaneously assume its proper short-circuit value.

The voltage coils 56 of the nine impedance elements 35 to 43 are energized from the corresponding delta phases of the potential transformer secondary windings 12.

The first impedance relay element in each phase, designated 35, 38 and 41, respectively, is provided with a pair of normally open contacts 61 which are connected in series with a pair of normally open contacts 62 of the associated directional element 51, 52 or 53, respectively. Three pairs of serially connected contacts 61 and 62 are thus provided, which are connected in parallel between the positive terminal of the battery 6 and the tripping coil of the circuit-breaker 4, the other terminal of the tripping coil being connected to the other terminal of the battery, as shown.

The second impedance element in each phase, designated 36, 39 and 42, respectively, responds to more remote faults than the first impedance elements and is provided with a pair of normally closed contacts 63 which short-circuit the first timing element 44, 46 or 49, as the case may be.

The third impedance element in each phase, designated 37, 40 and 43, respectively, is adjusted to respond to still more remote faults and is provided with normally closed contacts 64 short-circuiting the second timing element in its corresponding phase, designated 45, 48 or 50, respectively. The first and second timing elements, as 44 and 45, in each phase, are provided with normally open contacts 65 and 66, respectively, the separation of the contacts 66 of the second element being about twice as great as that of the first element, so that a longer time interval is required before the contacts are closed after the response of the corresponding impedance or distance-responsive element, as 36 or 37, respectively. The six contacts 65 and 66 of the six timing elements 44 to 50 are connected in parallel between the positive terminal of the battery 6 and the tripping coil 5 of the circuit-breaker.

The three pairs of timing elements 44, 45; 46, 48; and 49, 50, derive energy from three current transformers 67 which are connected in series with the respective current coils of the three phases. The respective current transformers are short-circuited by normally closed contacts 68 of the respective directional elements 51, 52 and 53, so that the timing elements 44 to 50 can not receive any power unless the line current is flowing in a predetermined direction.

According to my present invention, the three directional elements 51, 52 and 53 are provided with voltage coil terminals 71, 72 and 73, respectively, which are energized from a special voltage source 74 having terminals marked $V_1$, $V_2$ and $V_3$. The voltage source 74 preferably derives its power from a different step-down transformer 75 separate from the potential transformer 10 which supplies the voltage for the distance responsive elements. This transformer 75 may be either a separate potential transformer or a power transformer. My special source of voltage for the directional relays 51 to 53 includes a dynamo-electric machine 76 having primary windings 77 which are connected across the auxiliary voltage mains $V_1$, $V_2$ and $V_3$. These mains are loosely coupled, in some manner, to the step-down transformer 75, as by means of serially connected resistors or other impedance devices 78, so that a short-circuit on the step-down transformer 75 will not operate as a direct short-circuit on the voltage mains $V_1$, $V_2$ and $V_3$, the voltage of which is maintained by the dynamo-electric machine 76 floating thereacross.

Preferably, my auxiliary voltage source 74 for the directional relays 51 to 53 comprises a synchronous-synchronous motor-generator set consisting of a synchronous motor 80 having primary windings 81 which are connected to the step-down transformer 75 through impedance devices 78, and a synchronous generator 76, the two machines being connected together by a mechanical coupling 84 by means of which an adjustment may be made to put the voltages of the two primary windings 81 and 77 of the motor-generator set in any desired phase-angle relation. The motor-generator set is very small in size and capacity so that it occupies little space. Its rotor members have sufficient kinetic energy, either of themselves or by reason of a fly-wheel, if necessary, to enable the generator 76 to hold up the voltage of the directional relay element, and to prevent the generator and motor of the motor-generator set from getting out of phase more than, say, 45° throughout the period during which the fault is being cleared, which may be something like 6 to 10 cycles, or any other length of time, depending upon the particular apparatus utilized.

Preferably, also, the two synchronous machines 76 and 80 are two-pole machines, as indicated in the drawing, so that the rotor will always synchronize in the same position. To the same end, the field windings 86 and 87 of the two machines are separately excited from any convenient direct-current source, or, as shown in the drawing merely for the sake of convenience of illustration, from two batteries 88 and 89, respectively.

With the arrangement as described above, even though a severe three-phase short-circuit should occur on the line close to the relaying point, so that the line voltage is reduced to a very low value, the directional voltage which is applied to the wattmeter directional elements 51, 52 and 53 is maintained at a sufficiently high value to ensure that the directional relays operate promptly and correctly.

It is desirable that the voltage winding terminals 71, 72 and 73 of the three directional relays 51, 52 and 53 shall be impressed with a voltage having a phase which is about 30° behind the phase of the current in the respective current coil terminals 55 of the several directional elements, when the transmission line is operating at unity power factor. Thus, when a short-circuit of very poor power factor occurs in the line, the fault current will not lag too far behind the phase of the voltage coil of the directional wattmeter element. In general, the voltage coil should have a phase position intermediate between the phase of the current coil when the line is operating at unity power factor, and the phase of the line during expectable fault conditions. With the particular connections illustrated in the drawing, where the current coils of the directional elements, for instance, the directional element 51, are energized by the delta current $I_A - I_C$, the corresponding voltage coil should be energized with a voltage in phase with the star line voltage $L_s$, or a voltage in phase opposition thereto, the only difference being that the voltage terminals would have to be interchanged in one case.

My auxiliary voltage source 74 is obviously susceptible of other uses, such as supplying voltage to timing switches, etc., as indicated by the synchronous motor switch 90, provided that sufficient power is provided for this purpose.

My directional relay elements 51 to 53, while shown as being energized, on their voltage sides, from my auxiliary voltage source 74, and while being shown as applied to relays responsive to faults other than single-phase grounds, are obviously not necessarily limited to the application which I have described, although such application is the service at present preferred for the same. In fact, the particular combination of the four directional elements 15, 51, 52 and 53 for taking care of all of the exigencies of relaying, so far as the direction of current flow is concerned, is a particularly economical one, requiring a minimum of relay elements and a minimum of KVA capacity in potential transformers and current transformers.

All of my directional elements, 15, 51, 52 and 53, are substantially instantaneous in action and operate on the galvanometer principle, as explained in my aforesaid copending application, as distinguished from previously used wattmeter directional elements operating on the induction principle, which comprised rotating discs carrying induced eddy currents, and which could not be designed so as to act in less than two cycles or one-thirtieth of a second, which is entirely too slow for the high-speed service for which my invention is designed.

While I have shown my invention in connection with a single preferred relaying system, it is obvious that various changes and modifications may be made without departing from the spirit of my invention. I desire, therefore, that the appended claims shall be accorded the broadest construction consistent with their language and the prior art.

I claim as my invention:

1. A protective relay system for an alternating current transmission line, comprising a high-speed directional relay-element having a current coil and a voltage coil, characterized by a source of voltage for said voltage coil having a phase dependent upon the line voltage but having means for preventing a rapid change in phase and/or magnitude even though the phase and/or magnitude of the line voltage should change suddenly, said means comprising a small two-pole synchronous-synchronous motor-generator set, and means for adjusting the relative spatial phases of the primary windings of the motor and generator, respectively.

2. The combination including a three-phase transmission line having a circuit-breaker and a relay system for controlling the operation of said breaker, said relay system comprising, in general; a line-to-ground fault-detecting portion characterized by a plurality of distance elements responsive to the distance of line-to-ground faults and a single directional element associated with said distance elements and responsive to residual currents and residual voltages; and a second fault-detecting portion responsive to faults involving a short-circuit between either two or three phase-conductors of the line and characterized by a plurality of distance elements having voltage coils and means for causing said voltage coils to be responsive to delta line voltages and three directional elements associated therewith and having voltage coils and means for causing said last-mentioned voltage coils to be energized from a voltage source which is normally dependent, in phase, on the transmission-line voltage, but which does not vary as quickly in phase upon the occurrence of severe near-by faults.

3. The combination with a three-phase transmission line having a circuit breaker, of relaying equipment for controlling the operation of said breaker, characterized by means for deriving three delta-phase currents from, and proportional to, the line currents, means for deriving three delta-phase voltages from, and proportional to, the line voltages, means for deriving three voltages which are normally dependent, in phase, upon the line voltage but having means for preventing a rapid change in phase and/or magnitude even though the phase and/or magnitude of the line voltage should change suddenly, distance relay-elements responsive to said delta-phase currents and said delta-phase voltages, associated directional relay-elements responsive to said dependent voltages which do not change suddenly and also responsive to some function of the line current, and means for tripping said circuit breaker jointly in response to predetermined positions of any one of said distance relay-elements and its associated directional relay-element.

4. The combination with a three-phase transmission line having a circuit breaker, of relaying equipment for controlling the operation of said breaker, characterized by means for deriving three phase currents from, and proportional to, the line currents, means for deriving three phase voltages from, and proportional to, the line voltages, means for deriving three voltages which are normally dependent, in phase, upon the line voltage but having means for preventing a rapid change in phase and/or magnitude even though the phase and/or magnitude of the line voltage should change suddenly, distance-responsive elements energized by the two first-mentioned means, and directional elements energized by the first-mentioned means and the last-mentioned means, for rendering said distance-responsive elements ineffective except when current is flowing in a predetermined direction.

5. The combination with an alternating-current transmission line having a circuit breaker, of relaying equipment for controlling the operation of said breaker, characterized by means for deriving a relaying current from, and proportional to, the line current, means for deriving a relaying voltage which is normally dependent, in phase, upon the line voltage but having means for preventing a rapid change in phase and/or magnitude even though the phase and/or magnitude of the line voltage should change suddenly, and a directional element energized from both of said means, the voltage applied to the directional element having a phase intermediate between the phase of the current applied thereto when the line is operating at unity power factor and the phase of the current applied thereto during expectable fault conditions.

6. The combination with an alternating-current transmission line having a circuit breaker, of relaying equipment for controlling the operation of said breaker, characterized by means for deriving a source of voltage having a phase dependent upon the line voltage but having means for preventing a rapid change in phase and/or magnitude even though the phase and/or magnitude of the line voltage should change suddenly, said means comprising a small two-pole synchronous-synchronous motor-generator set including an abnormally high impedance in the primary circuit of the motor.

7. The combination with an alternating-current transmission line having a circuit breaker, of relaying equipment for controlling the operation of said breaker, characterized by means for deriving a source of voltage having a phase dependent upon the line voltage but having means for preventing a rapid change in phase and/or magnitude even though the phase and/or magnitude of the line voltage should change suddenly, said means comprising a small two-pole synchronous-synchronous motor-generator set including an abnormally high impedance in the primary circuit of the motor, and means for adjusting the relative spatial phases of the primary windings of the motor and generator, respectively.

8. The combination with a three-phase transmission line having a circuit breaker, of relaying equipment for controlling the operation of said breaker, characterized by means for deriving three voltages which are normally dependent, in phase, upon the line voltage but having means for preventing a rapid change in phase and/or magnitude even though the phase and/or magnitude of the line voltage should change suddenly, said means comprising a small two-pole synchronous-synchronous motor-generator set.

In testimony whereof, I have hereunto subscribed my name this 26th day of April, 1930.

SHIRLEY L. GOLDSBOROUGH.